(12) United States Patent
Suonvieri et al.

(10) Patent No.: US 6,373,833 B1
(45) Date of Patent: Apr. 16, 2002

(54) CELL EXPANSION IN A TIME DIVISION CELLULAR SYSTEM USING FREQUENCY CONVERTING REPEATERS

(75) Inventors: Jukka Suonvieri, Tampere; Risto Uola, Helsinki, both of (FI)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/236,258

(22) Filed: Jan. 25, 1999

Related U.S. Application Data (63) Continuation of application No. PCT/FI97/00434, filed on Jul. 3, 1997.

(30) Foreign Application Priority Data

Jul. 25, 1996 (FI) .................................................. 962972

(51) Int. Cl.[7] .............................................. H04B 7/212
(52) U.S. Cl. ..................................... 370/347; 370/321
(58) Field of Search ............................... 370/347, 348,
370/344, 276, 277, 280, 281, 293, 294,
329, 330, 331, 442, 501, 492, 315, 321,
319; 455/422

(56) References Cited

U.S. PATENT DOCUMENTS

| | | |
|---|---|---|
| 4,301,530 A | 11/1981 | Gutleber |
| 5,152,002 A | 9/1992 | Leslie et al. |
| 5,200,955 A | 4/1993 | McFarlane et al. |
| 5,404,570 A | 4/1995 | Charas et al. |
| 5,408,679 A | 4/1995 | Masuda |
| 5,883,884 A * | 3/1999 | Atkinson ..................... 370/279 |
| 5,910,943 A * | 6/1999 | Wickman .................... 370/279 |
| 5,924,022 A * | 7/1999 | Beasley et al. ............. 455/218 |
| 5,943,323 A * | 8/1999 | Olanders et al. ............ 370/315 |
| 6,032,057 A * | 2/2000 | Kiiski ......................... 455/562 |

FOREIGN PATENT DOCUMENTS

| | | |
|---|---|---|
| EP | 0 690 638 | 1/1996 |
| GB | 2 242 337 | 9/1991 |
| JP | 63-51727 | 3/1988 |
| WO | WO 95/02306 | 1/1995 |
| WO | WO 95/12956 | 5/1995 |
| WO | WO 96/22636 | 7/1996 |
| WO | WO 97/21320 | 6/1997 |

* cited by examiner

*Primary Examiner*—Dang Ton
*Assistant Examiner*—Brian Nguyen
(74) *Attorney, Agent, or Firm*—Altera Law Group (57) ABSTRACT

In a TDMA cellular mobile communications system the radio interface between a mobile station and a base station consists of traffic frames which include several time slots in which in one time slot of an uplink direction frame the mo-bile stations can transmit in an access burst a request to the network to be assigned a radio connection for traffic. A repeater is added in the system through which the radio connection between the base station and the mobile station can pass, if necessary. The repeater converts the carrier wave frequency used by the base station to the carrier wave frequency used by the mobile station, and the carrier wave frequency used by the mobile station to the carrier wave frequency used by the base station. The repeater adds its own burst to the access burst of the mobile station, the said burst including the information which identifies the repeater.

7 Claims, 4 Drawing Sheets

CELL EXPANSION IN A TIME DIVISION CELLULAR SYSTEM USING FREQUENCY CONVERTING REPEATERS

This application is a continuation of PCT Application No. PCT/FI97/00434, filed Jul. 3, 1997.

FIELD OF THE INVENTION

This invention relates to a time division cellular mobile communications system in which the radio interface between a mobile station and a base station consists of traffic frames comprising of several time slots in which the mobile stations can transmit in one time slot of an uplink frame to the network a request in an access burst to be provided with a radio connection for traffic.

BACKGROUND OF THE INVENTION

Figure 1:
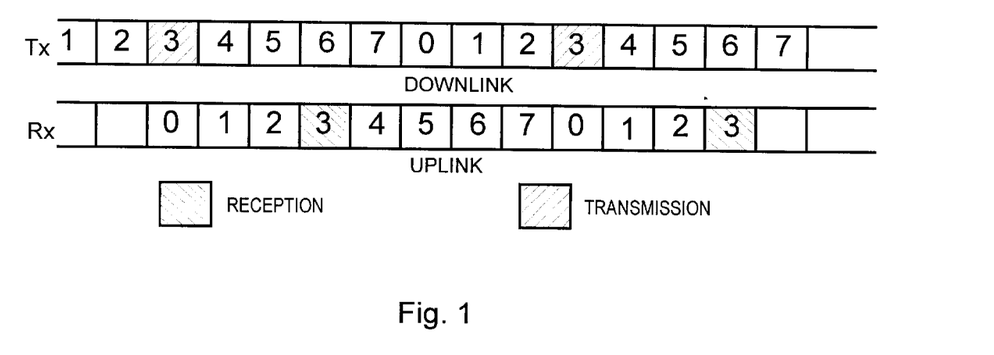
FIG. 1 shows transmission and reception time slots of a base station.

A radio system based on time division multiple access (TDMA) features frame structures so that the transmission and reception frames consist of time slots. The transmission occurs in a certain frequency and in a certain time slot, and the reception occurs in a certain frequency and in a certain time slot. The transmission and reception frequencies can be the same frequency, as in, for example, a DECT system, or they can be different frequencies, as in, for example, GSM and DCS systems, which are thereby both time division and frequency division systems. As an example of a TDMA system the following examines a GSM/DCS system. In this system the length of one TDMA frame is 4.615 ms and it consists of eight time slots, numbered from 0 to 7. The number of a time slot is referred to by the abbreviation TN (Time Slot Number). The duration of one time slot has been defined as $(576+12/13)$ µs or the duration of $(156+1/4)$ bits. A full speed traffic channel TCH consists of every eighth time slot in a cyclic manner, so from the viewpoint of the network one carrier can be used to form eight traffic channels. The traffic from the mobile station to the base station (uplink direction) and the traffic from the base station to the mobile station (downlink direction) has been arranged in such a manner that the reception in the base station occurs three burst durations later than the transmission. In this case the transmission time slot number of a transmission frame TN and the time slot number of a reception frame (TN) are identical. This is illustrated in FIG. 1 the upper part of which shows the consecutive time slots of a certain transmission carrier and the lower part the consecutive time slots of the reception frequency related to this carrier. The frequencies are generated by using a transceiver TRX. A TRX unit can change its frequency, in which case a different frequency can be in use during each time slot. There must be several TRX units so that it is possible to use several frequencies within one time slot.

The consecutive time slots TN=0 of reception frames of a certain frequency in a base station form the RACH (Random Access Channel) and in this channel the network receives the requests transmitted by mobile stations to be given access to channel resources. The RACH is an uplink channel only. If the request is accepted, the network transmits on the PAGCH (Paging and Access Grant Channel) the acknowledgement of the request and the information as to which channel the mobile station must switch to. The PAGCH is a downlink channel only and it consists of the consecutive time intervals TN=0 of the frames of a certain transmission frequency.

The following bursts can be distinguished from one another: access burst, F and S bursts and normal burst. The difference between them is in their time-amplitude profile. The normal burst is the longest burst of all; its duration is 148 bits and it is used in the traffic channel and in most signalling cases. It includes two sequences of 58 bits which are separated by an training sequence of 26 bits, and, at the beginning and the end of the burst there are three tailing bits. The duration of normal bursts must be slightly smaller than that of a time slot so that when a base station receives, the bursts transmitted in adjoining time slots do not overlap. The transmission of the normal burst in a mobile station starts by the amount of the timing advance TA before the reception time slot in the base station begins, in which case the burst arrives in the time slot right at the beginning of the slot and the entire burst fits in the slot. F and S bursts are only transmitted in the downlink direction in frequency correction and synchronization channels and they are used when the mobile stations synchronize themselves to the base station and to correct frequency errors caused by movement.

The access burst is only used in the uplink direction at the beginning of a connection when the propagation delay between the base station and mobile station is not known. This is the situation when the mobile station contacts the network via the RACH and in some cases in handover situations when the mobile station moves to a new cell. The access burst includes an training sequence of 41 bits, 36 information bits and 7 tailing bits at the beginning and 3 tailing bits at the end, or a total of 87 bits (the length of a normal burst is 148 bits). The access burst is thereby very short and no other bursts are used in the RACH. The base station receives access bursts in the RACH, in other words, in the time slot TN=0 and, if the network simultaneously receives several bursts, it rejects them all. The mobile station retransmits the access burst until the request is accepted and a traffic channel is assigned to the mobile station. The training sequence of the burst is longer than that of a normal burst so that the probability of success in the demodulation of the burst is high. This is important because the receiver does not know the level of the burst, frequency error, or time of arrival within the time slot. Because the propagation delay between the mobile station and base station is not known when the access burst is used, the arrival of the access burst to the base station features a time error compared to the reception time slot, the length of which is two times the length of the propagation delay. To compensate this the duration of the access burst is short so the mobile station can progress as far as 35 km before the access burst misses the reception time slot.

The aforementioned 35 km is at the same time in theory the maximum cell radius in the network. When it is desirable to expand the system to sparsely populated or uninhabited regions by arranging the radio coverage of the system to cover at least the main roads, complete radio coverage can only be achieved by placing fully equipped base stations at intervals of 70 kilometers. This is a rather expensive solution because a fully equipped base station contains a great deal of expensive components and the base station link mast must be extremely high. However, the distance can be increased, especially on flat terrain, by building the base station masts even higher and by using only every other time slot of a frame. The time slots used are the even ones, because the time slot TN=0 is reserved for access bursts. When only every other time slot is used, the timing advance values achieved are tremendous, so the cell radius can be expanded to a much higher value than 35 km, at the expense of channel efficiency.

On the other hand, when it is desirable to have good radio coverage in a densely populated region, fully equipped base stations must be placed very close to one another. This must be done, of course, because of the great traffic density, but especially when it is desirable to arrange coverage in indoor spaces, such as car parks, department stores, subway stations, etc., in other words, places where there are a lot of people but where radio wave penetration is poor. More base stations must also be established if it is desirable to arrange radio coverage to shadow regions between and behind tall terrain features. When the base stations are added, the number of Abis interfaces also increases which include the interfaces between the base station controller BSC and the base stations controlled by it.

The patent application FI-933091 describes a method to expand the cell radius to a value considerably in excess of 35 km. The application suggests that the timing of the receiver of one transceiver unit is delayed in relation to the transmitter. This is implemented by delaying the frame clock and time slot clock of the receiver. In this case, the burst that arrives from a distance of over 35 km hits the delayed reception time slot. Bursts that arrive from distances of under 35 km do not hit this time slot but use the time slot with normal timing. The unit of the delayed receiver thereby serves a circular region around the actual basic cell. In this manner it is possible to increase a cell with radius of 35 km to a cell with radius of 60 km.

Expansion of the system and to achieve perfect radio coverage in indoor and outdoor shadow regions both require more fully equipped base stations which significantly increases the costs. Because of this the possibility of using repeater stations as base stations has been studied. The idea of a repeater station has been known for a long time, for example, from broadcasting, and it is used in the analog cellular system to some extent. It is characteristic of these solutions that the repeater station merely amplifies the incoming signal and retransmits it on the same frequency. Application of this method is well suited to AMPS and other frequency division duplex (FDD) systems, because the envelope of the received signal corresponds with the envelope of a Rayleigh faded signal. However, so far it has not been possible to apply the idea to time division TDMA systems or in FDD/TDD systems primarily because of the time division nature of the systems, in which case the time dispersion (frequency selectivity) must be taken into account.

Firstly, the received signal is no longer a single Rayleigh faded signal but, because of multipath propagation, the sum of several Rayleigh-fading signals with different delay. The channel equalizers of the receivers in base stations and mobile stations and the bit pattern, or training sequence, are such that the system can correct the received signal up to a delay of 16 $\mu$s, but if a repeater station repeats, in a time division multiplex system, the frequencies of a base station as they are, the base station can no longer distinguish whether a signal was intended for the base station or the repeater, and it can no longer, in general, distinguish from one another the signals which arrive on the same frequency.

Secondly, from the viewpoint of the network, the base station and the repeater station linked to it form one cell and the network does not get any information about whether the mobile station is located within the area of the base station or the area of the repeater station linked to the base station. The current time division cellular networks do not contain elements by using of which the network is able to detect whether the radio path contains extra elements, such as repeaters. This is a significant drawback especially if it is desirable to have individual tariffs. The operator may, for example, want to compensate the costs caused by the coverage arrangements of shadow regions by charging more for calls made in shadow regions.

The objective of this invention is thereby a base station arrangement which is suitable for a time division multiplex cellular system which makes it possible to use both an extended cell and to cover the shadow areas without adding the interfaces in a base station and between base stations and, additionally, makes it possible to detect in the area of which repeater station a call has been made.

The set objectives are achieved by using the specifications expressed in independent claims.

BRIEF SUMMARY OF THE INVENTION

All connections from the area of a repeater pass to the base station controller through the same base station. It is possible that the connections of even several repeaters pass through the base station, in which case the repeater group formed by the repeaters can cover the shadow regions of the cell or the repeater can be used to extend the radio coverage of the base station to cover a larger area, in other words, to form a so-called extended cell. The base station operates on the frequencies assigned to it in network planning, but each repeater performs a frequency conversion so that during a traffic connection the mobile stations operate on different transmission/reception frequencies to the direction of the repeater compared to those which are used in traffic between the repeater and the base station. Because the frequencies are different, the transmission signal of the mobile station does not disturb the operation of the base station by causing co-channel interference.

The use of different frequencies makes it possible to use frequency hopping within the repeater area. In this case, the base station jumps in a normal manner from the frequency assigned to it in network planning to another at the same time as the mobile station jumps from one frequency to another within the frequency band used by the repeater.

The use of different frequencies also makes it possible to use a handover function within the repeater. When the mobile station moves to an area where it hears the new signal frequency better than the one on which it is operating, it signals the base station controller of the fact. The base station controller commands the mobile station to switch to the new frequency but continues its own operation on the old frequency, in other words, the frequency between the base station and the repeater does not change.

When the repeater is located within the cell, there is no need to alter the timings, but the timing advance value TA indicated to the mobile station by the network is valid as it is. When the repeater is located at the cell boundary and its coverage area extends the cell, the situation requires a timing advance greater than possible in the system as it is. In this case, it is possible to use a method according to the patent application FI-993091 and delay the reception in the base station. It is also possible to implement a solution in which there is no one-to-one relation between the reception time slot of the base station and the transmission time slot of the mobile station to the direction of the repeater. The same is also valid for time slots in the downlink direction of the connection. In this case, the repeater must contain buffers, in which case the repeater first receives the burst transmitted by the mobile station and relays the burst after a delay in the reception time slot of the base station. This is, however, a difficult method.

According to another characteristic feature of the invention the repeater synchronizes itself to the transmission from the base station and determines from it the time slots used for different purposes. In this manner the repeater detects the time slots for uplink direction RACH, in which case it can observe whether there are any access bursts arriving in the time slot from the repeater area. When the repeater receives a burst, it also transmits an extra burst which contains an individual identifier of the repeater in the same time slot in which it transmits this mobile station access burst to the base station. The identifier can be a code similar to the training sequence. The base station controller decodes the identifier, in which case it is possible to identify the repeater via which the mobile station has started the connection. The base station controller knows the channel states, so it allocates a free traffic channel to the base station controller and commands the mobile station to a traffic channel which is not the same as the base station channel, but one of the channels used by the repeater. The base station does not know this but operates in the usual manner.

According to the preferable embodiment, the efficiency of the resource use of the repeater group can be improved so that the handover between the repeaters is made possible so that the traffic time slot used by the base station remains the same as before the handover, in other words, from the viewpoint of the base station the handover is performed to the same time slot. In this case, it is possible to switch from one repeater to another within a repeater group, even if the base station did not have any free time slots.

BRIEF DESCRIPTION OF THE DRAWINGS

The detailed description of the invention will now be made with reference to the attached drawings, in which.

DETAILED DESCRIPTION OF THE INVENTION

Figure 2:
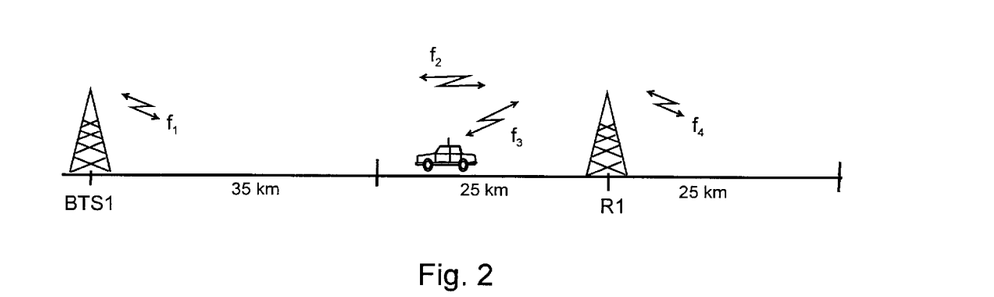
FIG. 2 illustrates a repeater arrangement in the case of an extended cell.

FIG. 2 shows the maximum cell radius of 35 km which can be achieved by using the base station BTS1. The cell has been extended by the repeater station R1 to which it is possible to connect within the propagation delays from a distance of approx. up to 25 km. From the point of view of network planning, the repeater forms an independent base station which has all parameters determined from the specifications of the actual cellular system. The repeater station is always connected to the base station controller (not shown in figures) through the base station BTS, so a separate connection between the base station controller and the repeater is not needed. In GSM/DCS systems this means that an extra Abis interface is not needed.

Figure 3:
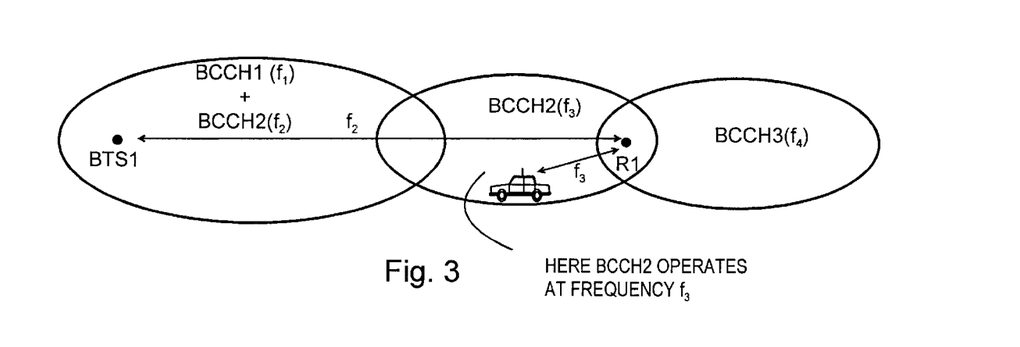
FIG. 3 shows the frequencies used in cells.

FIG. 3 shows the arrangement in FIG. 2 "from the top" so that the carrier wave cones of the base station and the repeater station are more easily visible. The base station BTS1 does not emit omnidirectionally but it transmits a different carrier to different sectors. The method is common especially when arranging radio coverage on highways, in which case one group of carrier wave frequencies is emitted in one direction and another group in the opposite direction of the road. For clarity it is assumed that the base station uses one pair of frequencies, in other words, a channel for the connections in the cone of the cell shown in the figure and the repeater uses one pair of frequencies or a channel per cone. Henceforward the term frequency refers to a channel which consists of the uplink and downlink frequencies. The base station BTS1 emits two BCCH carrier waves in the direction of the repeater R1: BCCH1 on frequency $f_1$ and BCCH2 on frequency $f_2$. The latter frequency is intended purely for traffic between the base station and the repeater, whereas the first frequency BCCH1 is intended for the base station cell, in other words, up to the distance of 35 km in FIG. 2. The repeater R1 repeats the broadcast channel BCCH2 transmitted by the base station BTS1 on frequency $f_2$ in the direction of the base station but changes it to frequency $f_3$. Correspondingly, the repeater converts the transmission which arrives from the mobile station on frequency $f_3$ to frequency $f_2$ and relays the information on this frequency to the base station. In the opposite direction the repeater uses the BCCH frequency $f_4$.

The frequency conversion performed by the repeater shown in FIGS. 1 and 2 is also valid on a more common level regardless of the frequencies assigned to a base station in network planning. Several RF units can be installed in a repeater and thus it is possible to use several frequency pairs. In this case, the frequency conversion must be made between several frequencies. Were the frequency conversion not done, the signal transmitted by the mobile station would proceed to the base station by using two different paths, which would result in a bad or completely failed connection. The reason for this is that the bits which would travel a different distance on the same frequency would arrive in the base station at different times and the bits could no longer be detected. Now the mobile station is connected to the repeater station R1 on the frequency $f_3$ and the connection continues from the repeater station to the base station on the frequency $f_2$. Correspondingly, if the mobile station is on the right side of the repeater station (FIGS. 1 and 2), the connection between the repeater station and the base station uses the frequency $f_4$, as the frequency used by the base station is still $f_2$. The repeater station thereby always performs the frequency conversion "frequency used between the base station and the repeater station←→"frequency used between the repeater station and the mobile station".

If the repeater is omnidirectional, all mobile stations which are located in its area operate on the same frequency, if there is only one frequency (in other words, eight traffic channels), or on the same frequency of the frequency group, if there are several frequencies. The repeater always performs the frequency conversion so that it does not use any of the frequencies which the base station uses in its direct connections to the mobile stations located in its area.

Figure 4:
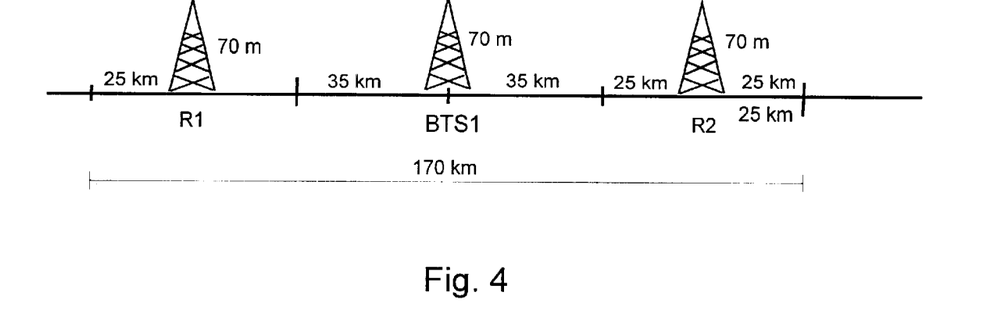
FIG. 4 shows the maximum coverage which can be achieved by the use of repeaters.

When a cell is extended by using two repeaters, it is possible to achieve a theoretical cell diameter of 170 km by using a rather low, 70 m tall antenna, FIG. 4. In this case the base station is located in the middle of the cell and the repeater stations R1 and R2 are located at the edges of the cell.

Figure 5:
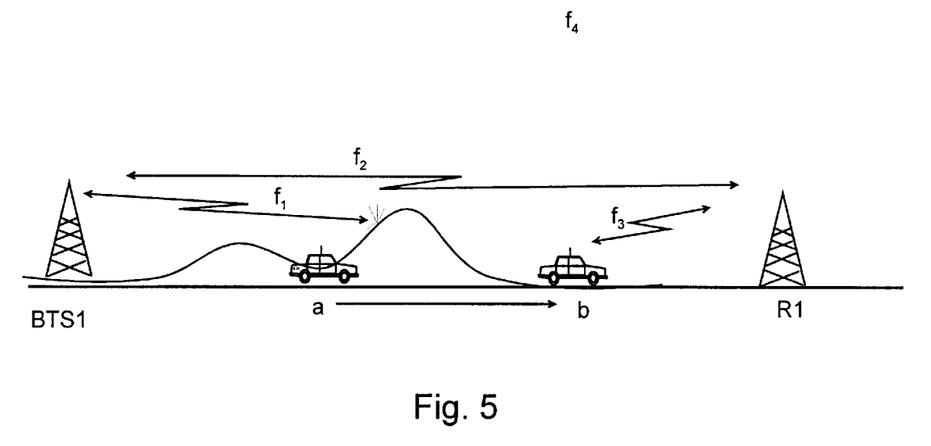
FIG. 5 shows the use of a repeater to cover a shadow area.
Figure 6:
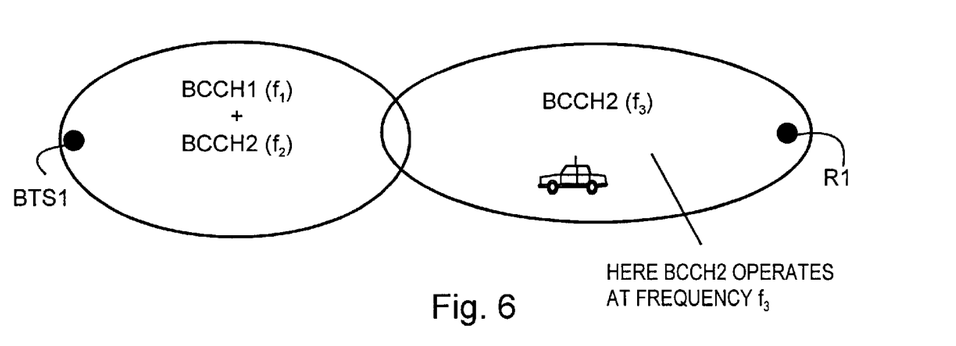
FIG. 6 shows the frequencies used in cells.

FIGS. 5 and 6 show a case in which the repeater is used to cover a shadow area in the cell of the actual base station BTS1. For simplicity it is still assumed that the base station and the repeater only use two carrier waves. The high terrain obstacle between the base station and the repeater R1 prevent the connection between base station and the mobile station located in the car on a frequency $f_1$ which is allocated to the base station. The repeater station is placed so that it covers the shadow region in question. The base station can be connected to the repeater station over the terrain obstacle and it uses for this connection the carrier wave BCCH2 which has been allocated the frequency $f_2$. The repeater station retransmits the BCCH2 information but uses the frequency $f_3$. The connection between the mobile station and the repeaters also uses the frequency $f_3$. The repeater thereby performs the frequency conversion $f_2 \leftarrow\rightarrow f_3$ in accordance with the invention.

If the car is located at first at location a, the mobile station is in direct connection with the base station on the frequency $f_1$. As the car proceeds behind the hill at location b, it arrives in the shadow region, at which point a handover is performed on the frequency $f_3$ and the connection is changed from a direct connection to a connection through the repeater R1. As the car proceeds further towards the repeater, it leaves the shadow area, at which point it would again be possible to use a direct connection with the base station. This would require another handover, so it is preferable to maintain the connection through the repeater R1.

A handover starts, as is known, so that when the mobile station leaves the area of the base station in which it is connected to the base station on the frequency $f_1$ and arrives in the area of the repeater, for example, in FIG. 2, it measures the signal strength of the transmission $f_3$ of the repeater to be greater than that of the transmission of the base station. The mobile station signals the information in the measurement report through the base station to the base station controller. The base station controller commands the mobile station to switch to frequency $f_3$ but itself continues traffic with the repeater station on the frequency $f_2$. The frequency conversion is performed by the repeater. In the handover, the base station controller must be able to perform the corresponding frequency cross-connection $f_2 \leftarrow\rightarrow f_3$ so that it knows the link frequency $f_2$ which corresponds to the frequency $f_3$.

Figure 7:
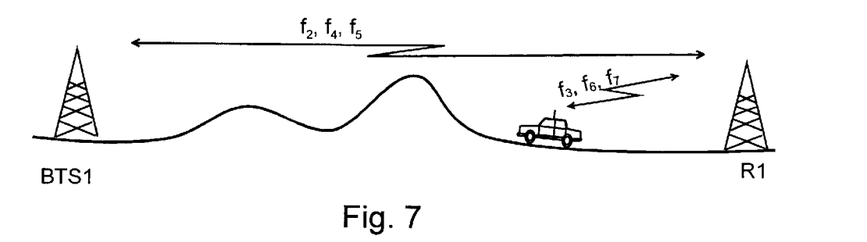
FIG. 7 illustrates a handover performed within the repeater.

The frequency hopping used in cellular networks can also be applied in the area of the repeater or in the area of a repeater group which consists of several repeaters. In this case, several RF converters which operate on different frequencies must be installed in the repeater. Then the base station "hears" the frequencies assigned to it in network planning, for example, the frequencies shown in FIG. 7, $f_4$ and $f_5$. Between the repeater and the mobile station, however, are used the frequencies $f_3$, $f_6$ and $f_7$. In frequency hopping the frequency between the mobile station and repeater is changed during the connection. The frequency used between the base station and the repeater can remain the same or it can be changed during each frequency jump. The latter method may be easier to implement as it does not require special changes to the current system: the network commands the base station to change the frequency according to the frequency jump algorithm, and the repeater automatically performs a frequency conversion, as a result of which the frequency used between the mobile station and the repeater changes in a corresponding manner. The frequency conversions can be, for example, $f_2 \leftarrow\rightarrow f_3$, $f_4 \leftarrow\rightarrow f_5$ and $f_5 \leftarrow\rightarrow f_7$. In the GSM system the Mobile Allocation table must be updated correspondingly and it must be processed during the operation in a suitable manner.

It is only possible to use a single frequency in the repeater. If channel jumping is used, in which case the number of RF repeater units must be increased, the number of available frequencies increases and simultaneously the traffic capacity in the repeater area increases.

In all of the above cases it is possible to use the normal timing advance procedure of the cellular network. The base station, or actually the base station controller, measures the distance of the mobile station on the basis of the time difference between the bursts transmitted and received by the base station controller and informs the mobile station of the timing advance value TA, by which amount the mobile station must adjust its transmission to occur earlier. If the repeater is used to cover a shadow area of the cell, the base station does not detect in any manner that the signal has at some point passed through a repeater. If the repeater is used to extend the cell to exceed the radius of 35 kilometers, as shown in FIGS. 2 and 3, it is possible to reach a situation in which the transmission must be adjusted to occur so much earlier that only every other time slot can be used in a frame or that delayed reception as shown in patent application FI-933091 must be used.

The above describes the use of the repeater for expanding a cell and for covering shadow regions of a cell. In the current cellular system the network always knows in which cell a call originates or terminates when a mobile station located within the region of a cell is the other party of the call. The information is included in the subscriber record generated after the call and it is important in invoicing when it is desirable to identify the cell in which the call originated. In the radio path the base station can be identified from the combination of the signal frequency BCCH+base station color code BCC which determines the training sequence used in the broadcast channels. The repeater cannot thereby change the color code, so when it is desirable to identify the repeater cell, a separate carrier wave must be used between it and the base station. In this case the base station knows on which frequency each repeater station operates in which case the connections made under the base station in question can be directed to the correct traffic channel. It is not possible, however, to identify the repeaters without their own BCCH carrier wave, because the current network does not include any elements which could be used to identify an extra repeater located on the radio path between the mobile station and the base station.

According to the second characteristic of this invention, the repeater station, in addition to performing the frequency conversion, also reports a code, which identifies the repeater station in its transmission in the direction of the base station. The repeater station reports this information in the access burst of the mobile station transmitted in the random access time slot. Because of this, the repeater is equipped with so much intelligence that it can synchronize itself to the broadcast of the base station, detect the different time slots from it and after this it can calculate when the uplink direction random access time slot TN=0 occurs. When this has been determined, every time the repeater detects an access burst from the mobile station during this time slot, it adds its own identification burst and then relays both bursts in the random access time slot further to the base station. It is typical for a cellular system that the access burst is located right at the beginning of the random access time slot and because of this the repeater adds the burst which includes its identification code at the end of the random access time slot. The repeater must therefore know the typical timing for the random access time slot, which can be set as a constant when the distance of the repeater from the base station is known. The code selected must be such that if the code and the actual access burst overlap in the time slot, the network does not detect them erroneously.

The base station is equipped with devices for decoding the burst added by the repeater and for recognizing the code, and for sending the code to the base station controller. The base station controller is equipped with devices for handling the repeaters logically as separate base stations whose channel resources, however, are shared.

Figure 8:
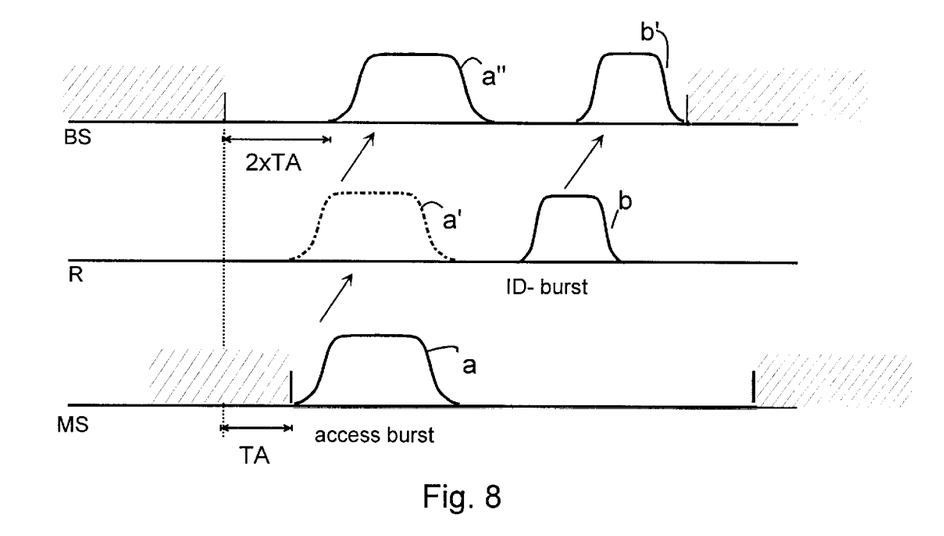
FIG. 8 shows the addition of the repeater identifier in the access time slot.

FIG. 8 shows the bursts used in the random access time slot. In the initial situation when the mobile station has synchronized itself to the network, the synchronization contains a timing error $\Delta T$ which is the same as the propagation time of the signal from the base station to the mobile station. When the mobile station MS transmits the access burst a at the beginning of the random access time slot (the time slot is located between the areas indicated by diagonal lines), the burst arrives at the repeater R which further transmits it as a burst a' to the base station BTS in whose reception time slot (between the areas indicated by diagonal lines) the burst arrives with a delay of $2 \times \Delta T$. The access burst received by the base station is shown as the burst a". This is a recognized issue. When the repeater R recognizes the access burst a, it adds to it the burst b which includes the identification code of the repeater, and transmits both bursts to the base station BTS without further delay. As the result the base station receives at the beginning of the access burst time slot the access burst a" of the mobile station and at the end of the time slot the burst b' which includes the identifier of the repeater station. The burst codes are selected in such a manner that if they drift to overlap each other, it does not cause erroneous interpretations. The bit pattern of the identifier code can be a suitable sequence similar to the training sequence. Eight different patterns is a sufficient number.

The base station transmits the information included in the bursts to the base station controller which, in turn, determines the free/reserved information of the channels and allocates a traffic channel to the mobile station. Now the network knows in the area of which repeater the call originates, so it can signal the mobile station with the information about the traffic channel available in the repeater cell in question. The network can also use this information for invoicing purposes.

Figure 9:
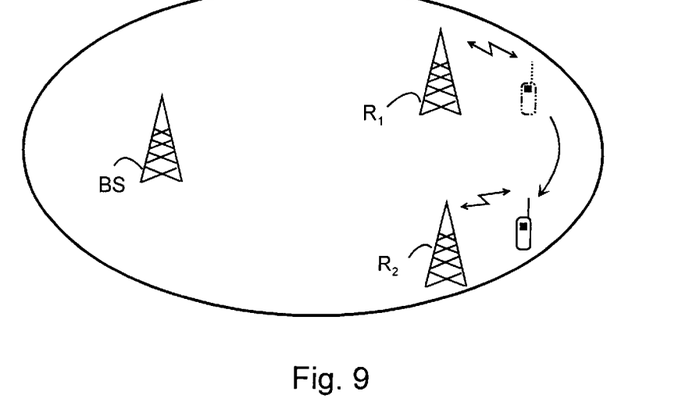
FIG. 9 illustrates the handover from one repeater to another.

It is possible to collect repeaters into groups which are connected in one base station, in which case when each repeater can be identified, it is possible to fully utilize the shared resources of the base station. In FIG. 9 the repeaters R1 and R2 form such a repeater group. The efficiency of a repeater group can further be improved by making it possible to perform a handover from a repeater, for example, R1, to another repeater, for example, R2, back into the same time slot of the actual base station BTS which was used during the connection with the old repeater station R1. This requires that it is possible to simultaneously activate in the base station a channel which is in traffic use to readiness for receiving handover bursts. In this case it is possible to switch from one repeater to another within a repeater group even though there are no free time slots available.

Figures 10A, 10B:
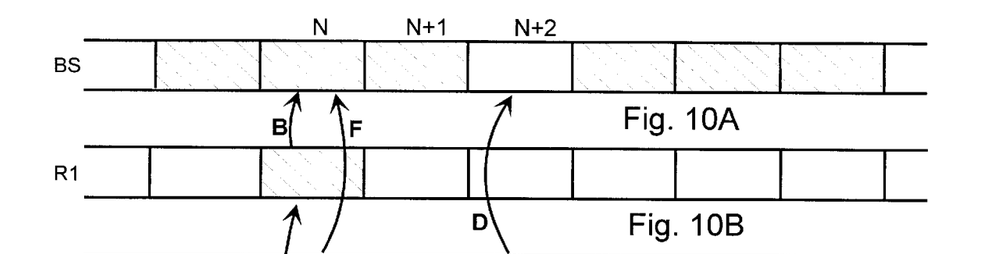
FIGS. 10A–10D show the use of time slots in the handover between repeaters.
Figure 10C:
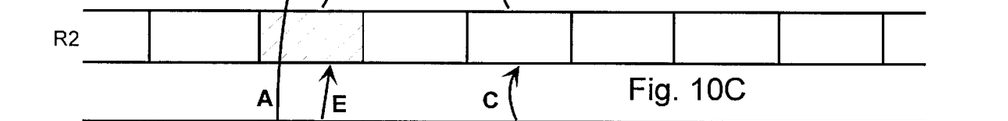
Figure 10D:
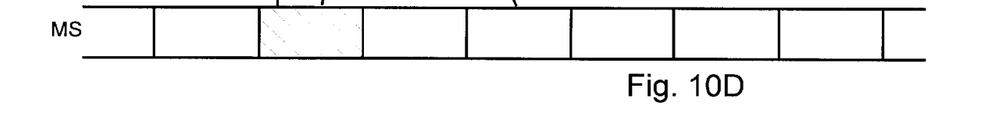

This idea is illustrated in FIGS. 10a to 10d. FIG. 10a shows the time slots of the base station, FIG. 10b the time slots of the repeater R1, FIG. 10c the time slots of the repeater R2, and FIG. 10d the time slots of the mobile station. The time slots can be either transmission or reception time slots. When the mobile station is in connection with the base station through the repeater R1, a connection is formed from the arrows A and B, in which the arrow A shows the connection between the mobile station MS and the repeater R1 on the frequency $f_2$ and the arrow B shows the connection between the repeater and the base station on the frequency $f_1$. The connections take place in the time slot N. Let it be assumed that the base station has only one free time slot N+2 available at the moment in question. The base station could allocate this time slot in a handover from repeater R1 to repeater R2, in which case the connection would be formed in the time slot N+2 as shown by arrows C and D. But if this were done, the time slot N would be freed in the base station frame. Now the action is, according to the invention, that the base station time slot is maintained the same as before the handover and the mobile station is commanded to switch to a new frequency, or the frequency of the repeater R2, but to still use the same time slot N. In this case, the connection is formed according to the arrows E and F. This is possible, because a frequency is freed in the base station channel or, in other words, the frequency-time slot pair, in which case it is possible to select the frequency used to the direction of the repeater R2 as the new frequency. The great advantage in this method is that in the fixed network, in other words, between the mobile switching center and the base station, there is no need to make new connections, because the channel (=PCM time slot) remains the same.

The repeater arrangement can be implemented in several different manners within the safety circuit defined in the claims.

What is claimed is:

1. A time division multiple access mobile communications system with repeaters connected to at least one base station controller through at least one base station, the system comprising:

a radio interface between a mobile station and a base station consists of traffic frames which include several time slots, wherein mobile stations can transmit, in an access burst in one time slot of an uplink direction frame to a network, a request to be assigned a radio connection for traffic, a repeater, for transmitting at least one frequency in a downlink direction, through which the radio connection between the base station and the mobile station can pass, wherein the repeater includes equipment for converting a carrier wave frequency used by the base station to a carrier wave frequency used by the mobile station, and equipment for converting the carrier wave frequency used by the mobile station to the carrier wave frequency used by the base station, and wherein the repeater further includes equipment for locating an uplink direction time slot during which the mobile stations can transmit the access burst, and wherein the repeater adds an extra burst to the uplink direction time slot in which the mobile station sends the access burst, the extra burst includes an identifier which specifies the repeater, and a handover allowing the communication between the base station and the mobile station to be switched between a direct connection and a connection through the repeater.

2. The mobile communications system according to claim 1, wherein the repeater sends the extra burst after the access burst, wherein the extra burst arrives at the base station at the end of the time slot.

3. The mobile communications system according to claim 1, wherein when the base station is connected to the mobile station through the repeater, a reception traffic frame of the base station is delayed compared to a traffic frame which the base station uses when in direct connection with the mobile station.

4. The mobile communications system according to claim 1, wherein a repeater group has been formed using several repeaters, every one of which is in connection with a same base station and uses same channel resources of the base station.

5. The mobile communications system according to claim 1, wherein the network commands the mobile station during handover to switch the carrier wave frequency, but retains the carrier wave frequency used by the base station as it is.

6. The mobile communications system according to claim 1, wherein when a handover is performed from a repeater connected to the base station to another repeater connected to the said base station, a time slot used by the base station and a time slot used by the mobile station remain unchanged.

7. The mobile communications system according to claim 1, wherein when a handover is performed between the base station and a repeater connected to the base station, a time slot used by the base station and a time slot used by the mobile station remain unchanged.

* * * * *